United States Patent
Ohba et al.

(10) Patent No.: US 6,412,607 B2
(45) Date of Patent: Jul. 2, 2002

(54) BRAKE LINING WEAR DETECTION APPARATUS

(75) Inventors: Mitsuyoshi Ohba; Toshiyuki Ishida; Shin Yoshida; Junya Kaneko, all of Tokyo (JP)

(73) Assignee: Tokyo-Buhin Kogyo Co., Ltd, Tokyo (JP)

( * ) Notice: Subject to any disclaimer, the term of this patent is extended or adjusted under 35 U.S.C. 154(b) by 0 days.

(21) Appl. No.: 09/758,985

(22) Filed: Jan. 11, 2001

(30) Foreign Application Priority Data

Jan. 18, 2000 (JP) .......................... 2000-008529

(51) Int. Cl.[7] .............................................. F16D 55/02
(52) U.S. Cl. .................. 188/71.9; 188/72.7; 188/196 B
(58) Field of Search ...................... 188/1.11 W, 1.11 L, 188/71.7, 71.8, 71.9, 196 R, 196 B, 196 BA, 196 V, 72.8, 156, 157, 158

(56) References Cited

U.S. PATENT DOCUMENTS

| 4,721,190 A | * | 1/1988 | Schmidt et al. ......... 188/196 D |
| 5,000,294 A | * | 3/1991 | Hunnicutt et al. ....... 188/196 D |
| 5,931,268 A | * | 8/1999 | Kingston et al. ........... 188/158 |
| 5,957,246 A | * | 9/1999 | Suzuki .................... 188/1.11 L |
| 6,311,807 B1 | * | 11/2001 | Rinsma ....................... 188/156 |

FOREIGN PATENT DOCUMENTS

| JP | 10184748 | 7/1998 |
| JP | 11351296 | 12/1999 |

* cited by examiner

*Primary Examiner*—Paul N. Dickson
*Assistant Examiner*—Melanie Torres
(74) *Attorney, Agent, or Firm*—Robert W. J. Usher (57) ABSTRACT

In the expander (50) in a drum brake, when the brake is activated, the sleeve (56) is extended in the lateral directions in the drawing by the wedge (52) inserted within the housing (51), and the shoe engaged with the clip (58) is swung to press the lining (23) against the drum, and friction braking is performed. When the lining (23) wears away and the amount of movement of the sleeve (56) increases, the sleeve (56) is rotated by reciprocal action with a drive ring (62) that is engaged with the periphery of the sleeve and, thereby, the pressing screw (57) screwed thereon comes out by the amount of the increase of movement (the amount of wear on the lining). A flat surface (56c) is formed on the periphery of the sleeve and the detecting head (80) of the displacement detection apparatus detects the rotation of the sleeve (56).

9 Claims, 10 Drawing Sheets

BRAKE LINING WEAR DETECTION APPARATUS

FIELD OF THE INVENTION

The present invention relates to a brake lining wear detection apparatus for friction brakes, such as drum brakes or disc brakes, for detecting when the brake lining is abraded to or beyond a prescribed quantity, for example, up to a wear limit value.

BACKGROUND OF THE INVENTION

Friction brakes, such as drum brakes or disc brakes, press a brake lining (brake pads in disc brakes; in the present specification, the brake lining is a friction braking member such as a brake pad) against a brake member such as a rotating brake drum or disc (rotor), and thereby impart a friction braking action to the brake drum. The brake lining is gradually worn away by this friction braking action and when use of the brakes continues beyond this wear limit, effective braking becomes more difficult. For this reason, various brake lining wear detection apparatuses, for detecting when the wear on the brake lining progresses to a certain wear limit and providing a warning to the driver, are proposed.

One such apparatus is an apparatus that directly detects wear on the brake lining. An example of such an apparatus can be illustrated with the apparatus disclosed by this applicant in the specification for Japanese Patent Application Laid-open No. H10-184748. In this apparatus, a detecting jig is disposed from the back surface of the brake lining and faces the brake drum. Metal wiring connected to a warning circuit is embedded in the end of thereof in the form of a loop. The detecting jig is disposed so that the end portion contacts the brake drum when the wear on the brake lining progresses to the wear limit. When the end of the detecting jig is worn or broken by this contact and the metal wiring therein is cut, the warning circuit detects the breakage of the circuit from the change in current or voltage and warns the driver that the brake lining has reached the wear limit.

Other apparatuses indirectly detect the wear on the brake lining. For example, the apparatus disclosed in Japanese Patent Application Laid-open No. H11-351296 detects wear of the brake lining in drum brakes from the amount of piston movement in a wheel cylinder causing the swinging of the brake shoe. In drum brakes comprising an automatic adjusting mechanism, the end position of piston movement gradually moves as the brake lining wears away. By having a rod which moves in conjunction with the piston in the wheel cylinder and monitoring the amount of movement of this rod with a limit switch, [this apparatus] detects when the brake lining has reached the wear limit and then warns the driver.

However, in these types of conventional apparatuses, an electrical circuit that detects wear of the brake lining and transmits a signal is disposed near the wheels, which generate intense vibrations and heat as the vehicle travels. Breakage or disconnection of the electrical wiring or limit switch therefore occurs easily. These must therefore be made vibration resistant and able to tolerate the environment; it therefore becomes difficult to reduce costs.

Also, apparatuses that directly detect wear on the brake lining by the breakage of an electrical circuit have a problem with false detection because of the breakage of the wiring due to the vibrations when the vehicle is moving, as discussed above. Moreover, when the electrical circuit is short circuited, these apparatuses cannot detect when the brake lining has reached the wear limit. When wear on the brake lining has been detected and these detection apparatuses are replaced, the wear detecting jig must also be replaced with a new part at the same time. For this reason, parts costs at replacement result in even higher running costs, and the man hours necessary to connect the electrical wiring also result in increased running costs. These apparatuses also have structural problems such as the risk of wiring being cut due to mistakes during replacement.

SUMMARY OF THE INVENTION

It is an object of the present invention to provide a brake lining wear detection apparatus having high reliability, and that can be constituted at low cost with a constitution of simple parts.

The present invention is an apparatus for detecting wear on brake linings in a friction brake (for example, drum brake 3 in the first embodiment or disc brake 5 in the second embodiment) comprising: a lining member (for example, brake shoe 20 in the first embodiment or inner pad 120 and outer pad 120' in the second embodiment) on which the brake lining (lining 23 in the first embodiment, or pads 123, 123' in the second embodiment) is provided; a brake member (for example, brake drum 25 in the first embodiment or rotor 125 in the second embodiment) that is pressed and braked by the brake lining when the brake is activated; a pressing member (for example, pressing screw 57, 157 in the first and second embodiments) for pressing the brake lining onto the brake member when the brake is activated; means for generating pressing force (for example, diaphragm, wedge 52, tappet 54 in the first embodiment, or diaphragm, shaft S, operating shaft 152 in the second embodiment) for causing the pressing member to exert the pressing force; a transmission member that screws onto a pressing member between the pressing member and the means for generating pressing force and is disposed rotatably about this screw shaft, and which transmits the pressing force generated by the means for generating pressing force to the pressing member in the direction of the screw shaft (for example, sleeves 56, 156 in the first and second embodiments); and an adjustment mechanism which rotates the transmission member about the screw shaft to cause the pressing member to project according to the wear on the brake lining, and which automatically adjusts the space between the brake lining and the brake member when the brake is not activated so as to become a predetermined, prescribed magnitude. Furthermore, the brake lining wear detection apparatus comprises: rotation detecting means (for example, displacement detection apparatus 70 in the embodiments) for detecting the state of rotation of the abovementioned transmission member or of a rotating member (for example, the wheel of 168 in the second embodiment) which rotates the transmission member; means for storing a number of rotations (for example, controller 30 in the embodiments) that counts and stores the number of rotations of the transmission member or rotating member from the state of rotation detected by the rotation detecting means; and warning means for performing a warning operation when it is determined that the number of rotations stored in the means for storing a number of rotations exceeds a predetermined and stored limit number of rotations.

As the brake lining (pad) is worn away by the action of the brakes (friction braking) in friction brakes comprising the abovementioned adjustment constitution, the pressing member pressing the lining member is caused to project as the abovementioned transmission member is caused to rotate about the screw shaft according to the wear on the brake lining, and the interval between the brake lining and the brake member when the brakes are not in use is automatically regulated so as to become a predetermined, prescribed interval. The number of rotations from the initial state of the transmission member is equivalent to the amount of the projection of the pressing member and is an amount that indicates the amount of wear on the brake lining. The present invention uses the properties of the regulating action of the adjustment mechanism and comprises a brake lining wear detection apparatus [that functions as follows]. The state of rotation of the transmission member or the rotating member that rotates the transmission member during the regulating action is detected with the rotation detecting means. The means for storing a number of rotations calculate and store the number of rotations of the transmission member or rotating member from the state of rotation detected. Then, the warning operation means perform a warning operation when it is determined that the state of rotation stored in the number of rotations storing means has exceeded a predetermined and stored limit number of rotations.

For this reason, the brake lining wear detection apparatus with the abovementioned constitution makes possible high precision detection of the state of wear on the brake lining and also does not require replacement of the wear detecting jig when the brake lining has worn away and the lining members are replaced. Consequently, [this apparatus] reduces parts costs as well as the man hours required for replacement and can therefore keep running costs low; moreover, [this constitution] makes it possible to provide a lining wear detection apparatus with which there is no risk of wiring being cut due to errors made when the lining member is replaced.

Figure 3:
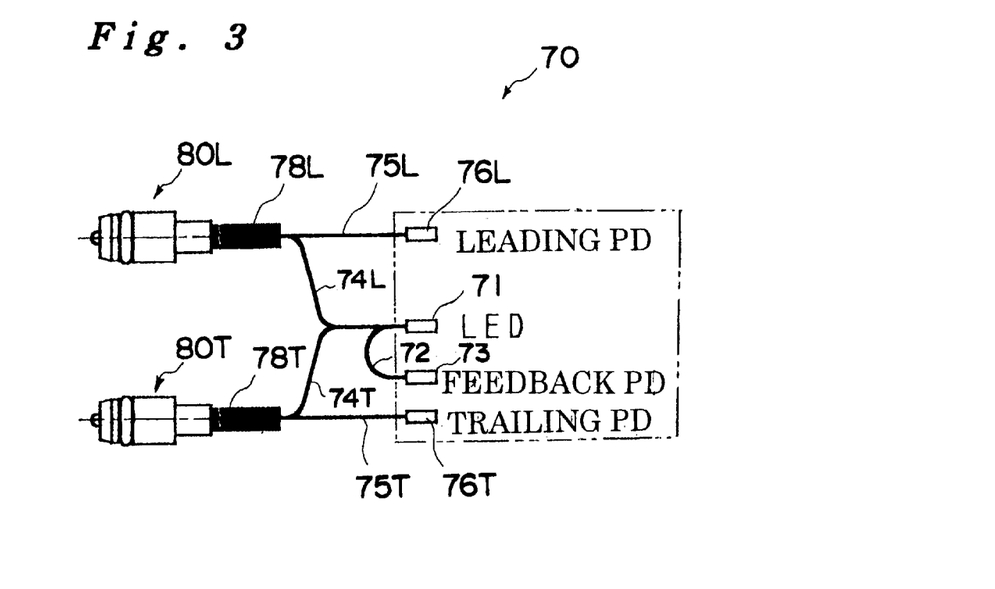
FIG. 3 is a drawing to explain the constitution of the displacement detection apparatus in the brake lining wear detection apparatus relating to the present invention.
Figure 4:
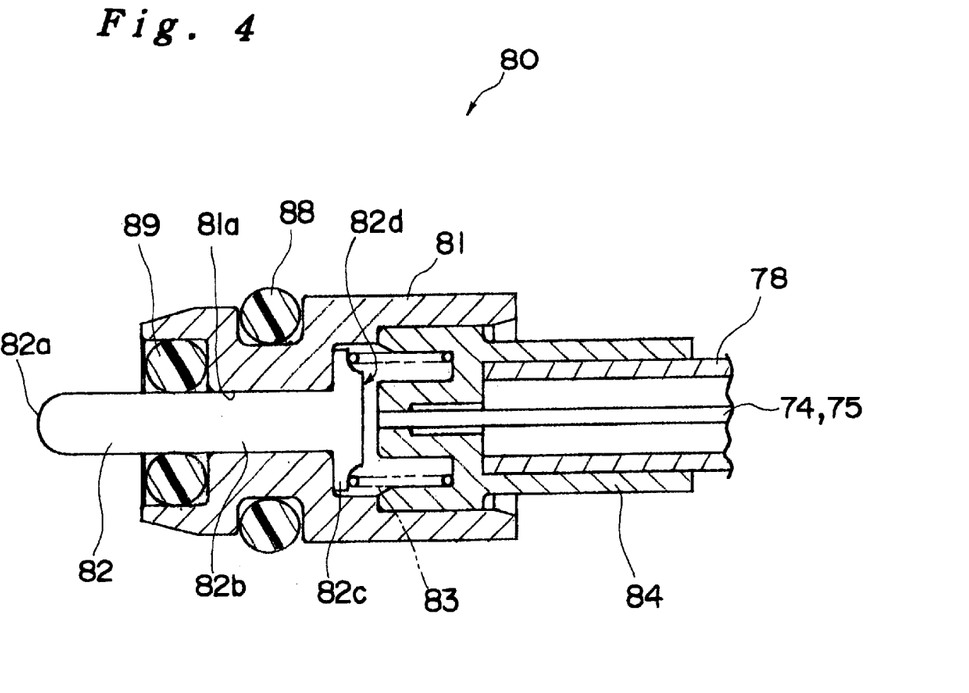
FIG. 4 is a cross sectional view of the detection heads in the abovementioned displacement detection apparatus.

Moreover, it is preferable that the brake lining wear detection apparatus be constituted so that the outer surface of the transmission member or rotating member includes a depression or projection (flat surface 56c in the first embodiment, or the gear portion 156a of the wheel 156 in the second embodiment), that is displaced when the transmission member or rotating member is rotated; and the rotation detecting means comprise a shifting member that contacts the outer surface of the rotating member and is displaced along with the depression or projection, and optical detecting means (optical detection system as shown in FIGS. 3 and 4 for the embodiments) for optically detecting the displacement of the shifting member; and so that the state of rotation of the transmission member or rotating member is detected by counting the number of passes of the depression or projection detected in this way.

Because this is a constitution for optically detecting the state of rotation of the transmission member or the rotating member that rotates the transmission member, the wear detection apparatus with the abovementioned constitution can be constituted so as to be highly resistant to electrical noise and the like. Also, the detecting terminal of the optical detecting means and the detection circuit substrate comprising an LED or photodiode are disposed separately. Because these can be connected with a flexible optical fiber with high heat resistance, it is not necessary to include any electronic components such as electrical wiring or a limit switch in the vicinity of the wheels, which generate intense vibrations and heat while the vehicle is moving. Consequently, it becomes possible to provide a lining wear detection apparatus that is highly reliable and has high resistance to vibrations and the environment.

Furthermore, because the state of rotation of the transmission member is detected via the shifting member, the optical detecting means can be optimized to have a small optical detecting portion. Because the transmission member follows the movement in the direction of the screw shaft by the braking action and the rotation about the screw shaft by the adjustment action, it is necessary to dispose the optical detecting portion over a wide area when this [movement] is directly detected. Also, lubricant is necessary in order to ensure the abovementioned movement and powder from abrasion is also generated by the sliding action over long periods of time. However, the constitution of the present invention has the optical detecting portion disposed separately through the use of the shifting member and therefore the optical detecting portion can be made small. Moreover, it becomes possible to have a constitution optimized for optical detection (for example, an optically reflective surface) wherein the effects of abraded dust and lubricating oil are eliminated. Consequently, it becomes possible to provide a lining wear detection apparatus that is highly reliable and can withstand its environment that is also small and low-cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

The preferred embodiments of the brake lining wear detection apparatus relating to the present invention are explained below with reference to the drawings.

First Embodiment

Figure 7:
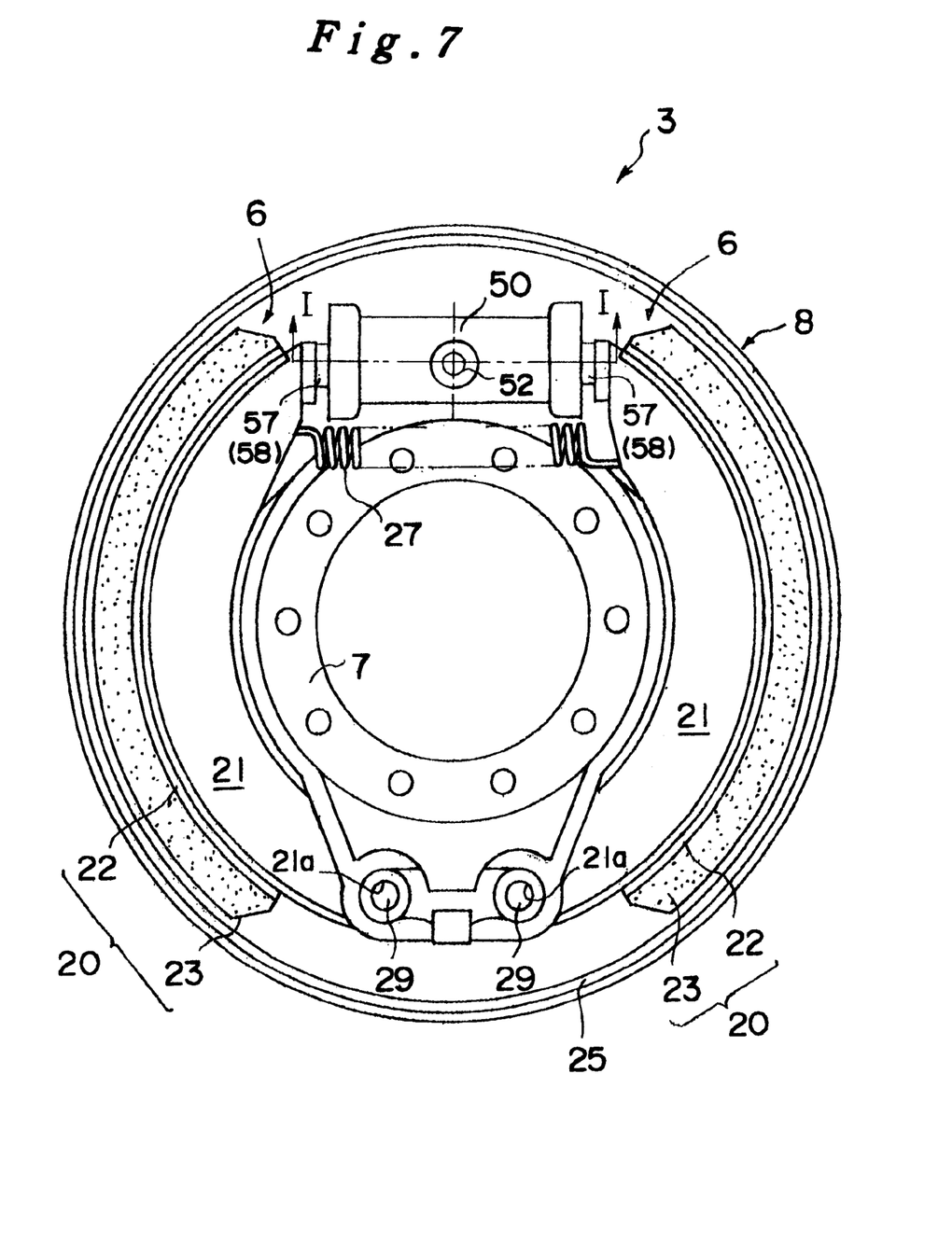
FIG. 7 is a front view showing the constitution of a drum brake that is provided the abovementioned brake lining wear detection apparatus.

FIG. 7 shows an embodiment of the brake lining wear detection apparatus relating to the present invention applied to a drum brake; this is explained below with reference to FIG. 7. The drum brake 3 is affixed to an axle housing (not shown) and comprises an anchor bracket 7 supporting the brake shoe unit 6, and a brake drum unit 8 covering the brake shoe unit 6 and that is disposed rotatably with respect to the anchor bracket 7. This is a so-called wedge brake using an expander (also called an actuator or wheel cylinder) 50 having a wedge that presses the brake shoe 20 of the brake shoe unit 6 on the brake drum 25 of the brake drum 8.

The brake shoe unit 6 comprises a pair of front and back supporting arms 21, 21 and brake shoes 20, 20 mounted on these supporting arms 21, 21; the base portion pivots on an anchor pin 29 inserted in the pin insertion hole 21a of the supporting arm 21 and is mounted swingably to the left and right in the drawing. The brake shoe 20 is a member corresponding to the lining members in the claims and comprises a supporting plate 22 of steel plate and a brake lining (hereinafter "lining") 23 attached with rivets to this supporting plate 22. Tension springs 27 connecting [the brake shoes] together are disposed on the end portions of the brake shoes 20, 20. Usually (brakes released), these brake shoes 20, 20 are held in a position swung inwards as impelled by the tension springs 27 (position separated from the brake drum 25).

An expander 50 attached to the axle housing is disposed between the end portions of the brake shoes 20, 20. As explained in detail below, the expander 50 causes the pressing screws 57, 57 to extend outwards to left and right when the brakes are operated. The expander resists the force of the tension springs 27, presses the end portions of the brake shoes 20, 20, and swings the brake shoes on the anchor pins 29, 29 so that the brake shoes are extended outwards.

A brake drum 25 (this corresponds to the brake member in the claims) is disposed outside of the brake shoes 20, 20 so as to surround the outside of the lining 23, 23. Due to the extending action of the abovementioned expander, the lining 23, 23 is pressed to the inner surface of the brake drum 25 opposite thereto and the rotation of the brake drum 25 is braked by the frictional force between these. The braking action of the wheel (not shown) on which the brake drum 25 is mounted is performed thereby. Moreover, as clear from the above explanation, this drum brake is constituted so that the leading side and trailing side are bilaterally symmetrical; this explanation uses the same numbers for the symmetric components.

Figure 1:
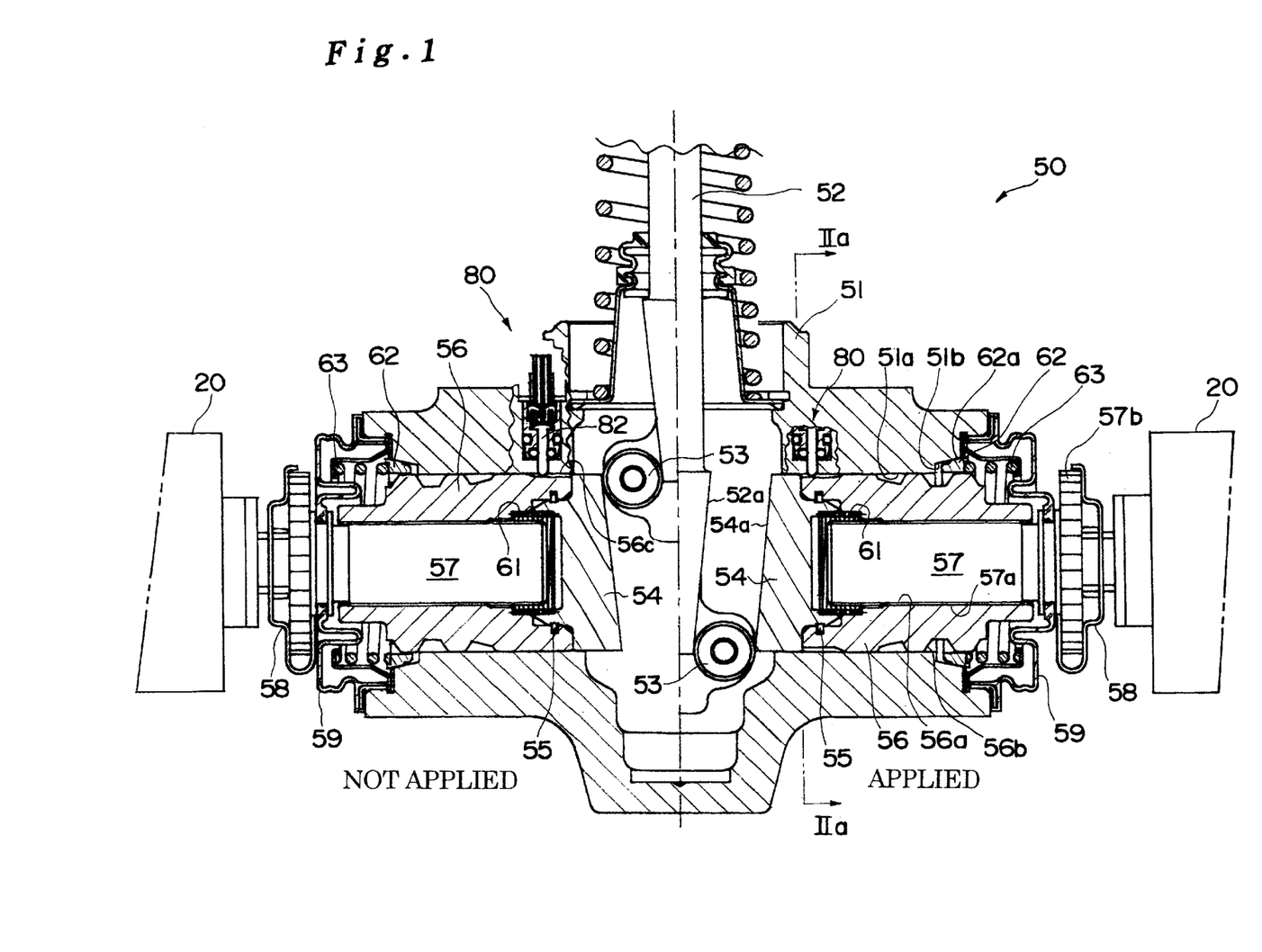
FIG. 1 is a cross sectional view showing the expander (wheel cylinder) in a drum brake that is provided the brake lining wear detection apparatus relating to the present invention.

FIG. 1 shows a cross sectional view at line I—I in FIG. 7. As shown here, the expander 50 comprises a housing 51; a wedge 52 mounted insertably on the housing 51 by the action of the diaphragm of a chamber (not shown); a roller 53 mounted by means of a retention plate on this wedge 52; a sleeve assembly disposed slidably in the direction of the cylinder axis (to the left and right in this drawing) inserted in a cylindrical cylinder portion 51a formed in the housing 51 and a pressing screw 57 for screwing onto the sleeve assembly and transmitting the pressing force to the brake shoe 20 (the combination of these is called the extending piston); and a boot 59 for preventing the influx of dust to the sliding portion. Moreover, the right half in FIG. 1 shows the state of the expander 50 when the brakes are in use and the left half shows the state of the expander 50 when the brakes are not in use.

The sleeve assembly comprises: a tappet 54 having an angled surface 54a that is pressed to the right and left in the drawing by the roller 53 by the insertion of the wedge 52; a cylindrical sleeve 56 that is connected to the tappet 54 by a snap ring 55 and that is able to move relatively to the tappet in a rotary direction about the cylinder shaft; and a wrap spring 61, the outer surface of one end of which is anchored to the cylindrical inner surface of the tappet 54 and the outer surface of the other end of which is anchored to the cylindrical inner surface of the sleeve 56. The wrap spring 61 has the function of a one way clutch; in the present embodiment, the wrap spring allows relative rotation in the direction of decreasing coil outer diameter (rightwards rotation in the case of a right-wrapped spring, for example). In the direction of increasing coil outer diameter (leftwards rotation in this case), the outer diameter of the spring clings to the tappet 54 and the sleeve 56 and joins with these to prevent relative rotation.

The pressing screw 57 comprises a female screw 56a formed on the cylindrical inner surface of the sleeve 56 and a male screw portion 57a that screws into 56a. The pressing screw is provided a regulating dial portion 57b extending outside of the housing 51 and has a form of a rod. A clip 58 is mounted on the regulating dial portion 57b; the clip engages with the brake screw 20 while being engaged rotatably about the screw shaft of the pressing screw 57.

Figure 2A:
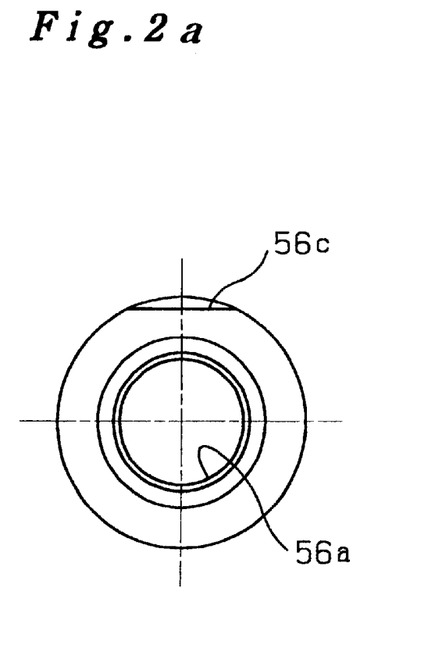
FIG. 2 shows two views of the sleeve in the abovementioned expander.
Figure 2B:
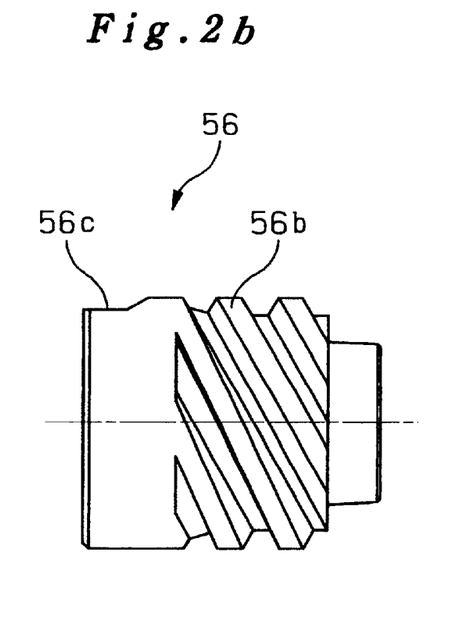

A helical spline 56b is formed about the outer peripheral portion of the housing in the sleeve 56, as shown in the exterior view (two views) of the sleeve 56 in FIGS. 2a and b. A drive ring 62 is screwed onto this helical spline 56b with a prescribed looseness (3mm, for example) in the direction of the cylinder axis. The drive ring 62 has a conical surface 62a that is in contact with the tapered surface 51b formed on the end surface of the cylinder portion of the housing 51. [The drive ring] is formed so that a constant frictional force is developed between these contact surfaces by the spring 63 that impels the drive ring 62 towards the interior of the housing.

Part of the cylindrical surface is chamfered and the flat surface 56c is formed on the outer surface towards the inside of the housing in the sleeve 56. On the housing 51, the detecting heads 80, 80 of the displacement detection apparatus 70 are mounted at positions corresponding to the outer surface of this chamfered sleeve (positioned in the direction of the cylinder axis).

FIG. 3 shows the principal constitution of the displacement detection apparatus 70. As shown here, the apparatus 70 comprises: a projecting LED 71, a feedback optic fiber 72 for detecting the emission state of the LED 71, a feedback photodiode 73, radiated light optic fibers 74L and 74T for guiding light from the LED 71 to the leading detecting head 80L and the trailing detecting head 80T, reflected light optic fibers 75L and 75T for guiding reflected light from the detecting heads 80L, 80T, leading photodiode 76L and trailing photodiode 76T for detecting the respective reflected light, and flexible metal tubes 78L and 78T for protecting the radiated light optic fibers 74L, 74T and reflected light optic fibers 75L and 75T. This is an apparatus for detecting the displacement position of the detected portion in the detecting head portion by guiding light from the LED 71 to the detecting head with the radiated light optic fiber and detecting the quantity of light reflected from this detecting head with a photodiode through a reflected light optic fiber. Moreover, the leading and trailing sides of the displacement detection apparatus 70 have the same constitution and therefore the same numbers are used in the following explanation with the letters L and T omitted.

FIG. 4 shows the constitution of the detecting head portion in detail. As shown in this figure, the detecting head 80 comprises a body 81, a shifting member 82, a spring 83, a fiber end member 84, and O-rings 87, 88.

The body 81 has O-ring grooves in the outer surface and one end surface that faces the inside of the housing 51 in the mounted position (this is the left side in the figure and is hereinafter called the front end); a bearing hole 81*a* is formed in the central axis portion. The shifting member 82 comprises a shaft portion 82*b* supported slidably by the body 81 and a flange portion 82*c* that spreads in the form of a lip. In the mounted position, a shaft portion 82*b* is inserted into the body from the back end that is the outside of the housing 51 and is mounted with the outer surface of the flange portion 82*c* impelled by a pressing spring 83 towards the front end. The back end surface of the flange portion 82*c* is ground flat and an optically reflective surface 82*d* is formed.

The fiber end member 84 supporting the other end of the spring 83 attaches and supports the radiated light optic fiber 74 and the reflected light optic fiber 75, while holding the fibers at a prescribed distance from the central shaft in the front end portion and exposing the end surfaces of both fibers; the fiber end member is affixed to the body 81 with a known attachment method such as press fitting or caulking of the outer surface of the member.

In the interior space thus formed within the body 81, the fiber end surfaces of the radiated light optic fiber 74 and the reflected light optic fiber 75 are disposed opposite to the optically reflective surface 82*d* of the shifting member 82. With the shifting member 82 continually impelled towards the front end by the spring 83, the shaft is sealed by the O-ring 87 in the front end portion. The lubricating oil and dust from the housing 51 are thereby prevented from penetrating to the optically reflective surface 82*d*.

Figure 5A:
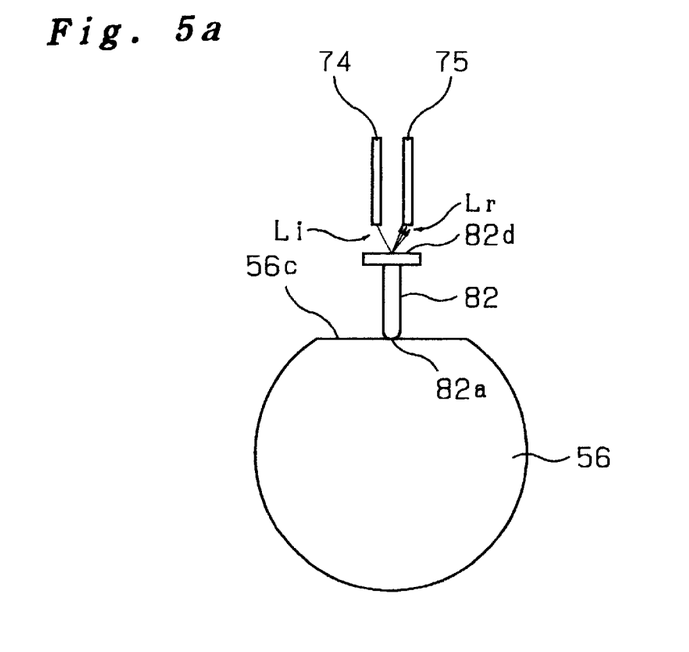
FIG. 5 is a drawing to explain the principle by which displacement is detected with the abovementioned displacement detection apparatus.
Figure 5B:
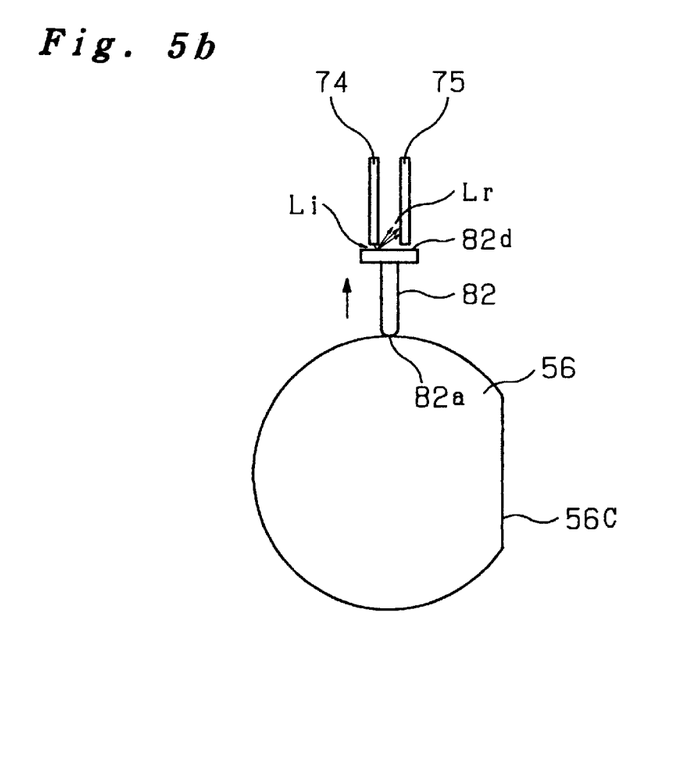

FIGS. 5*a* and *b* model the change in the state of reflection of light within the body 81 when the relative interval between the reflective surface and the ends of the optic fibers is changed in the case where the shifting member 82 moves in the direction of the axis, meaning that the optically reflective surface 82*d* is displaced with respect to the end surfaces of the radiated light optic fiber 74 and the reflected light optic fiber 75, in the detecting head 80 portion with the constitution as described above. The principle of detection by the displacement detection apparatus 70 is explained below using these drawings.

The condition shown in FIG. 5*a* shows the state wherein light strikes and is reflected by the optically reflective surface 82*d* when the shifting member 82 is extended by the force of the spring 83 to the flat surface 56*c* of the sleeve 56. In this state, the incident light Li from the radiated light optic fiber 74 is reflected by the optically reflective surface 82*d*. The reflected light Lr strikes the reflected light optic fiber 75 and is detected as a high brightness state (High) by the leading or trailing photodiode 76 in FIG. 3.

The condition shown in FIG. 5*b* shows the state wherein light strikes and is reflected by the optically reflective surface 82*d* when the shifting member 82 is pressed by the cylindrical surface of the sleeve 56 against the force of the spring 83 and is slid towards the inside of the body 81. In this state, the incident light Li from the radiated light optic fiber 74 is reflected from a position on the optically reflective surface 82*d* that is different from the position in the figure a above. Most of the reflected light Lr does not strike the reflected light optic fiber 75. For this reason, this state is detected as a low brightness state (Low) by the leading or trailing photodiode 76 in FIG. 3.

The leading or trailing photodiode 76 detects the intensity of the reflected light observed through the reflected light optic fiber 75. Consequently, as clear from such a principle for detection, it is possible with this displacement detection apparatus 70 to make an analog calculation of the displaced position of the shifting member 82 from the intensity of the reflected light detected by the photodiode 76.

In order to simplify the constitution in the present embodiment, the constitution used for the displacement detection apparatus 70 is able to distinguish between two states, whether the amount of the reflected light is in a high brightness state (High) or a low brightness state (Low), meaning that the position at which the shifting member 82 is in contact with the outer surface of the sleeve 56 is either the chamfered flat surface 56*c* (High) or the cylindrical surface (Low). Moreover, the example above shows that the quantity of reflected light is in a low brightness state when the shifting member 82 is tracing the over the cylindrical surface, but is also possible to have the opposite be the case.

The feedback photodiode 73 in FIG. 3 detects the intensity of light emitted from the projecting LED 71 and is disposed in order to reduce the level of error when calculating the displacement position (brightness determination) from the intensity of the reflected light. Consequently, there is no concern of false detection when the intensity of light emitted from the LED 71 changes over time or when the LED 71 is not emitting.

Next are explained the action of the expander 50 in the case of braking with the drum brakes 3, having the constitution discussed above, and the action of the adjustment mechanism when the lining wears away. As discussed above, when the brakes are operated, the wedge 52 of the expander 50 is pressed downwards in FIG. 1 by the action of a diaphragm, not shown. This pressing force is changed to a sideways pressing force through the rollers 53 by the action of the inclined surface of the wedge 52 and tappet 54 and is transmitted to the sleeves 56. The sleeves 56 on either side receive this pressing force and are extended (expanded) to both sides along the cylinder shaft so as to expand from the center of the expander. This is the position in the right half of FIG. 1.

The helical spline 56*b* formed on the outer surface of the sleeve 56 and the screw tooth surface of the drive ring 62 that engages therewith are formed so as to have a prescribed looseness (3 mm, for example) in the direction of the cylinder axis as discussed above. When the range of movement of the sleeve 56 is within the range of this looseness due to the abovementioned braking action, the sleeve 56 advances within the cylinder 51*a* without causing rotation of the drive ring 62.

The pressing screw 57, screwed onto the sleeve 56, engages with the brake shoe 20 through the clip 58 that holds the adjustment dial 57*b*. The pressing screw advances along with the sleeve 56 without rotating due to the frictional resistance of this clip 58 and the frictional resistance at the screw surface. The pressing screw then presses both the left and right brake shoes 20, causing the lining 23 to be pressed against the brake drum 25 by swinging these about the anchor pins 29, and brakes the rotation of the brake drum 25 by the frictional force between these members.

When the braking action is released, the wedge 52 moves upwards in FIG. 1 and the pressing screw 57 and sleeve assembly retract towards the center of the housing 51 (this is the state in the right half of FIG. 1) due to the action of the tension spring 27 extending between the brake shoes 20, 20. At this time, because the range of movement of the sleeve 56 is within the abovementioned range of looseness, the sleeve 56 moves within the cylinder 51a without rotating, as during the extending movement.

As the lining 23 wears away, the amount of movement of the pressing screw 57 and sleeve assembly in order to attain the same braking effect when the brakes are applied becomes large. At this time, the range of movement of the sleeve 56 when the brakes are applied exceeds the range of looseness with the screw tooth surface of the drive ring 62. The drive ring 62 screws onto and contacts the tooth surface 56b of the moving sleeve 56 and receives pressing force towards the outside of the housing 51. At this time, due to the force from the drive spring 63, the frictional force of the conical surface 62a that is pressed by the tapered surface 51b of the housing 51 is lessened and the drive ring 62 rotates along the tooth surface of the spline 56b. Moreover, at this time the sleeve 56 and pressing screw 57 advance without rotating due to the one-way function of the wrap spring 61.

When the braking action is released and the sleeve 56 returns into the housing 51, the drive ring 62, having been released from contact with the screw surface, is pressed towards the inside of the housing by the force of the drive spring 63. The conical surface 62a contacts the tapered surface 51b of the housing 51 and acts as a wedge. Consequently, the rotation of the drive ring 62 is suppressed by the frictional resistance at the context surface. Because of the looseness between the helical spline and the drive ring 62, the sleeve 56 contracts without further action and without resistance, but during extension, the working length corresponding to the extension from the rotation of the drive ring 62 again contacts the contraction side screw surface of the drive ring 62 during contraction.

At this time, rotation of the drive ring 62 is suppressed as discussed above and the drive ring cannot rotate freely. On the other hand, the wrap spring 61 contained within the sleeve assembly has a one-way function. In the case where the wrap spring contacts the elongation side screw surface so that the sleeve 56 presses the drive ring 62, the wrap spring 61 limits rotation in the direction along this screw surface (leftwards rotation, for example) and causes the drive ring 62 to rotate, but oppositely allows rotation in the direction of the sleeve 56 that is rotated along the contracted side screw surface (rightwards rotation, for example). In the contracted end portion, then, the sleeve 56 is rotated along the tooth surface of the drive ring 62.

As discussed above, the pressing screw 57 is engaged with the brake shoe 20 and receives frictional resistance from the clip 58 that is prevented from rotating about the axis. This frictional resistance is greater than the frictional resistance of the engaged screw surface, and the pressing screw itself therefore does not rotate along with the clip. For this reason, the sleeve 56 rotates independently with respect to the tappet 54 and the pressing screw 57. The engaged pressing screw 57 is payed out according to the angle of rotation by this rotation of the sleeve 56.

When the lining 23 wears away, the adjustment mechanism in this drum brake 3 causes the sleeve 56 to rotate according to the stroke of the sleeve 56 when the brakes are applied and automatically adjusts by paying out the engaged pressing screw 57, so that the space between the lining 23 and the brake drum 25 remains constant. The amount by which the pressing screw 57 is payed out equals the amount of wear on the lining 23; this quantity and the number of rotations of the sleeve 56 are made equal by converting the pitch of the engaged screw.

For example, the amount of the lining 23 used up to the wear limit is 10 mm and the amount of the pressing screw 57 let out corresponding to this amount of wear is 20 mm. When the screw pitch of the pressing screw 57 and sleeve 56 is 1 mm, then the wear limit position has been reached when the sleeve 56 has turned 20 times. Consequently, as discussed above, it is possible to detect the state of wear of the lining 23 at the current time by detecting the flat portion 56c formed on the outer surface of the sleeve 56 using the displacement detecting device 70 and counting up the number of times that this flat portion has passed, meaning the number of rotations.

Figure 6:
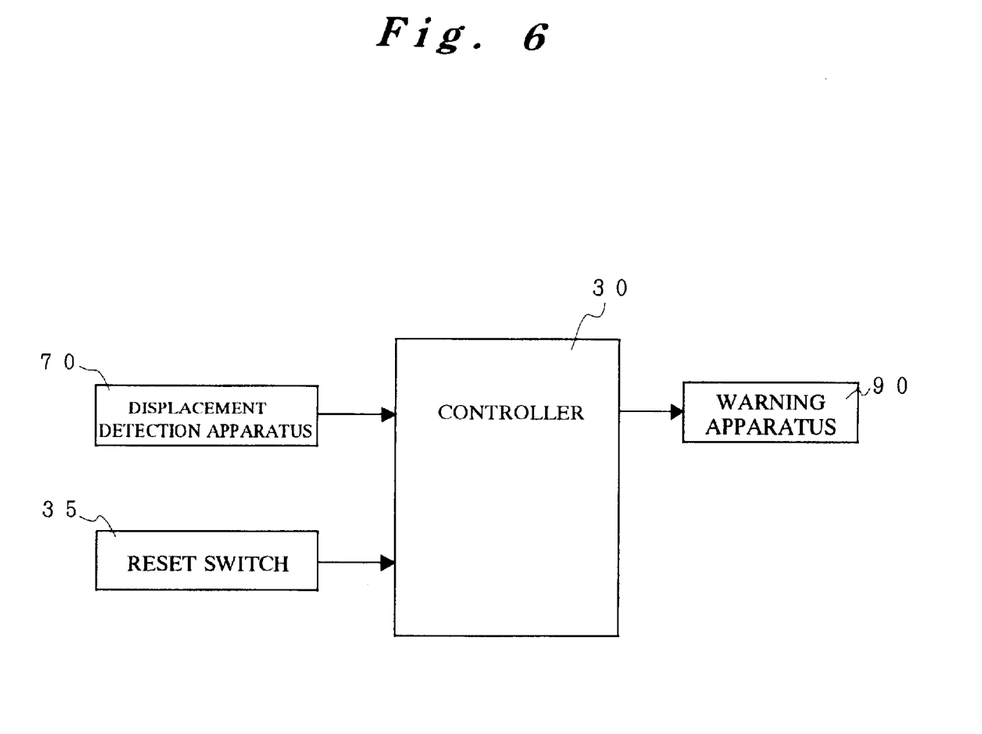
FIG. 6 is a block diagram showing the constitution of the brake wear detection apparatus relating to the present invention.

FIG. 6 is a block diagram of the constitution of the lining wear detection apparatus 1 and is explained below. This apparatus comprises the displacement detecting device 70 discussed above, a controller 30, a warning apparatus 90, and a reset switch 35. The information as to whether the intensity of the reflected light is bright (High)=1 or is not bright (Low)=0, indicating whether the rotary position of the sleeve 56 is at the flat surface 56c or the cylindrical surface, is input to the controller 30 from the displacement detecting device 70 as a binary signal of 1 or 0. When the value of the signal changes from 0 to 1 (or from 1 to 0), the controller 30 adds 1 to the cumulative number of rotations already stored in the prescribed memory in the controller.

The controller 30 compares the cumulative number of rotations of the sleeve 56 to a predetermined and stored number of rotations for a wear warning (called the limit number of rotations in the claims; for example, this can be 19 rotations (=9.5 mm of wear) in the example discussed above). When the controller determines that the number of rotations has not reached the number of rotations for a wear warning, the controller continues to count without generating a warning command. When the controller determines than the number of rotations for a wear warning has been reached and exceeded, the controller outputs a warning command signal to the warning device 90.

The warning device 90 performs a warning action based on the warning command signal from the controller 30. For example, the warning device informs the driver that the lining 23 is approaching the wear limit by lighting a brake lining wear warning lamp that is disposed at the vehicle driver's seat or by a voice alarm. It is also possible for the controller 30 and warning device 90 to have a plurality of warning levels. For example, when the number of rotations of the sleeve 56 has exceeded the first level, a wear notice display is made. Then as the wear progresses, a wear warning display is made at the second stage. At the third stage, a warning buzzer is activated and a warning operation, such as cutting fuel so that the vehicle speed cannot exceed a certain level, is performed.

When warning operations are made in this way, a person performs the operation to replace the worn brake shoes 20 based on these warnings, because the lining 23 is approaching the wear limit state and further use will result in reduced braking power. After the brake shoes are replaced, the reset switch 35 in the wear detection apparatus is operated and the cumulative number of rotations stored in the internal memory is reset to 0. Moreover, the reset switch 35 may also be automatically be set by the operation of replacing the brake shoes 20 and without a manual operation. For example, for brakes of the type where the anchor pin 29 is removed when the brake shoes 20 are replaced, the operation to replace the brake shoes 20 can be detected by detecting the engagement of the anchor pin 29 electrically or mechanically. Consequently, the reset switch 35 can have a constitution such that the cumulative number of rotations stored in the internal memory is reset to 0 based on such a detection signal.

Consequently, with the constitution as explained above, only the brake shoes 20 need to be replaced and it is not necessary to replace the wear detecting jig or the like at the same time when the lining 23 wears away and the brake shoes 20 are replaced. For this reason, it becomes possible to provide a wear detection apparatus with reduced parts costs and replacement time and that can keep running costs low. Additionally, there is no risk of wiring being cut in error when the brake shoes are replaced. Also, because this constitution allows optical detection of the number of rotations of the sleeve equal to the amount of wear of the lining 23, it becomes possible to constitute a wear detection apparatus that is highly resistant to noise such as electrical noise. Furthermore, because the detecting head 80 of the displacement detection apparatus 70 is disposed separately from the detection circuit substrate comprising an LED 71 and photodiode 76, it is not necessary to dispose electronics components in the vicinity of the wheels which generate intense vibrations and heat while the vehicle is moving. Consequently, it becomes possible to provide a lining wear detection apparatus that is highly reliable and highly resistant to vibrations and its environment.

Also, the displacement detection apparatus 70 detects the state of rotation of the sleeve 56 in a detection head 80 through a shifting member 82. As a result, the reflective surface 82*d* (optical detecting portion) can be made small in size, and moreover it becomes possible to easily constitute an optically reflective surface which is optimal for optical detection and is unaffected by abraded dust and the lubricating oil that is necessary to sustain stable action of the sleeve. Consequently, it becomes possible to provide a small and low-cost lining wear detection apparatus that is highly reliable and can withstand its environment.

In the abovementioned embodiment, a flat surface 56*a* for the detection of the state of rotation is formed at one location on the sleeve 56 and one signal per rotation of the sleeve 56 is counted in this example. However, it is also possible to have a plurality of such flat surfaces. For example, if flat surfaces are formed at four locations on the outer surface of the sleeve, the number of signals per rotation of the sleeve increases to four and the 20 rotations of the sleeve that are the wear limit in the example discussed above correspond to a total of 80 signals. The amount of wear on the lining per signal then becomes 0.125 mm. Consequently, increasing the number of detected locations can increase the resolution of the amount of wear on the lining.

Change in the binary signal input to the controller 30 from the displacement detection apparatus 70 is preferably determined by performing equalization processes for the signal value within a prescribed period of time or determining that the signal value has changed from 0 to 1 when the bright signal=1 is detected after a certain period of time. In the case where the action of an apparatus using this wear detection apparatus is stopped, such as when the main ignition switch of the vehicle is turned off, the controller 30 stores the signal state from directly before that stoppage and uses this in continuing to make the determination when the vehicle is restarted. With such a constitution, it becomes possible to improve the precision of detection by the lining wear detection apparatus while preventing incorrect addition by the controller 30.

Also, it is preferable that the displacement detection apparatus 70 output an error when there is some anomaly within the displacement detection apparatus such as when the LED 71 is cut off, and that the controller 30 make a display to that effect on the warning display device 90 based on this error input. With such a constitution, it becomes possible to provide a lining wear detection apparatus that is highly reliable and prevents a situation wherein a warning display is not made although the lining has really worn away.

Second Embodiment

Next, another embodiment of the lining wear detection apparatus relating to the present invention is explained. In this embodiment, the same type of wear detection apparatus as above is applied to disc brakes. Like the embodiment discussed above, this apparatus is an adjustment mechanism for automatically regulating the space between the pads and rotors when the pads (lining) are worn away, wherein the state of rotation of a sleeve that turns with the adjustment operation is detected by detecting the state of rotation of the wheel causing this sleeve to rotate and a warning operation is performed according to the number of rotations. This apparatus is explained below with reference to the drawings.

Figure 8:
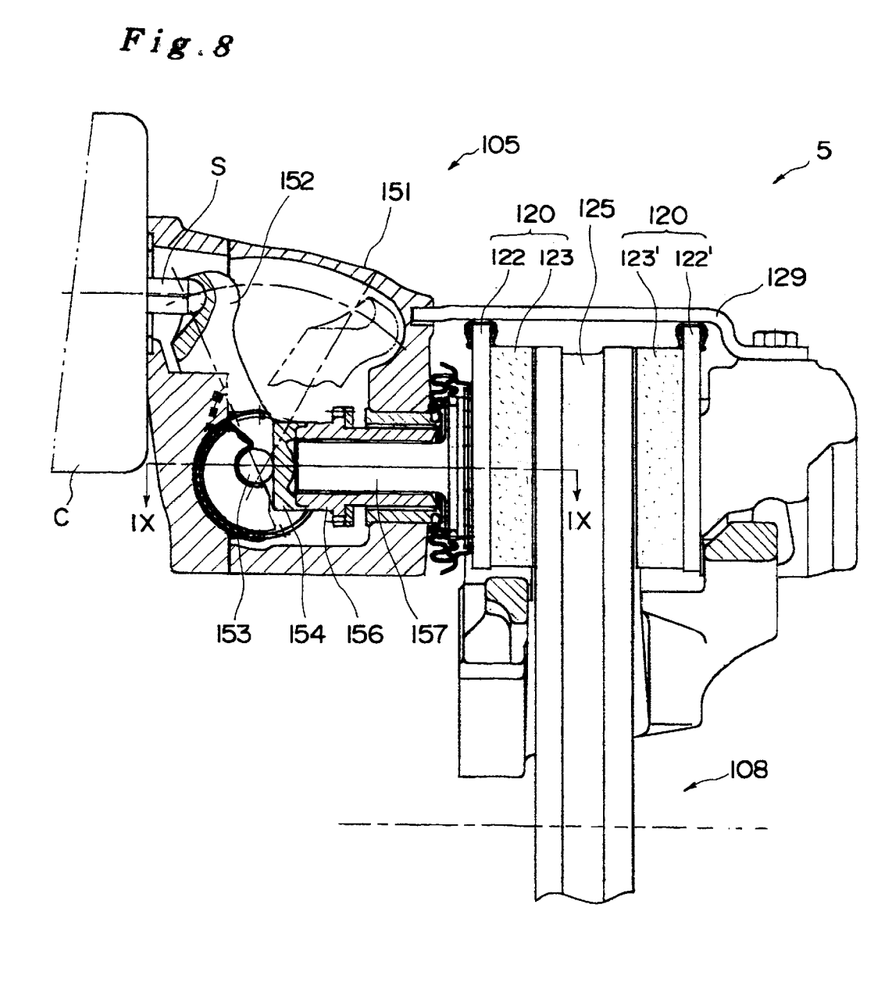
FIG. 8 is a sectional side view showing the constitution of a disc brake that is provided the brake lining wear detection apparatus relating to the present invention.
Figure 9:
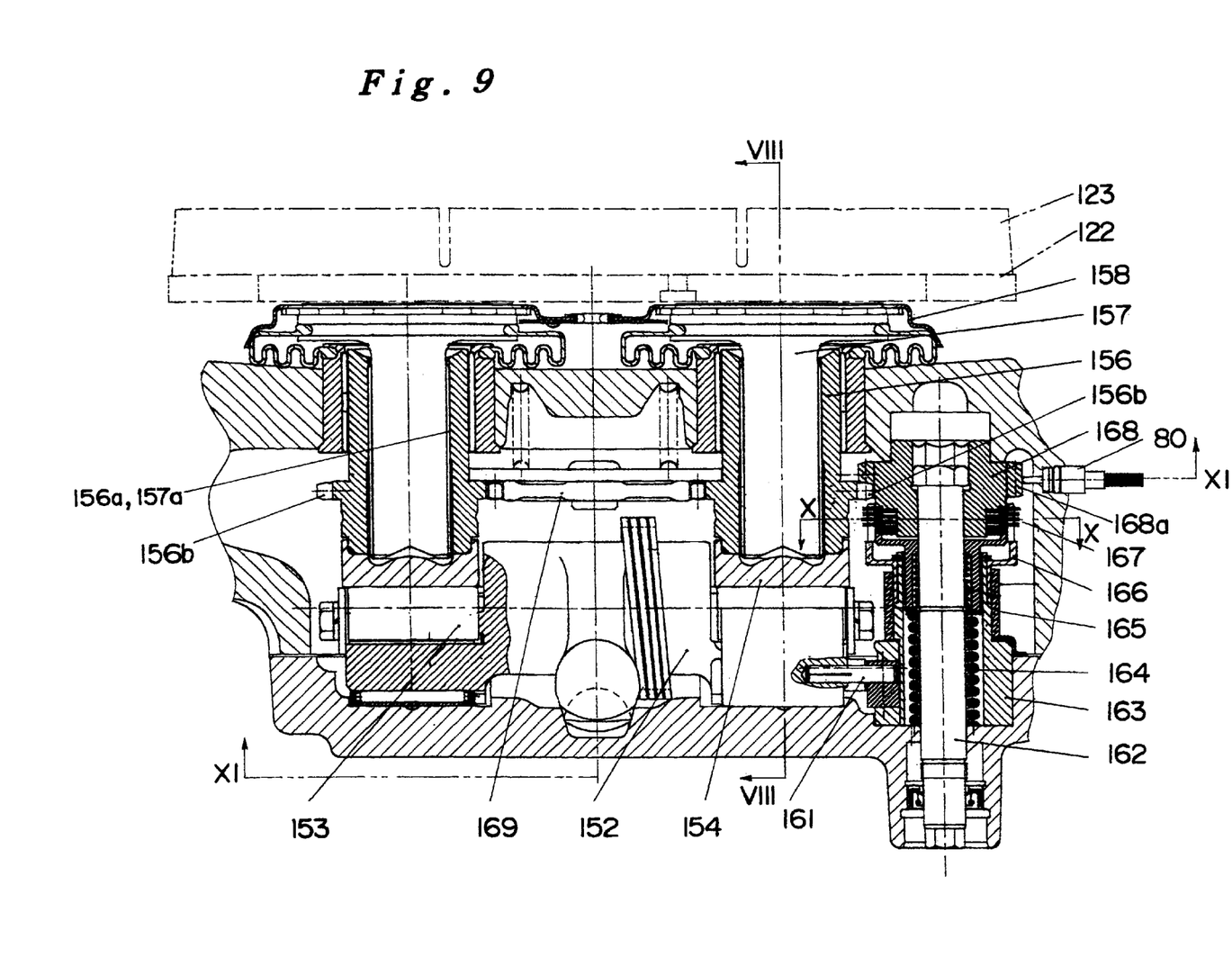
FIG. 9 is a sectional top view from above showing the constitution of the abovementioned disc brake (cross section at IX—IX in FIG. 8)

FIG. 8 shows a cross sectional view from the side of the disc brake 5. As shown in FIG. 9, a cross sectional view taken at IX—IX in FIG. 8, the disc brake comprises a caliper unit 105 mounted on the axle housing, not shown, and a rotor unit 108 mounted to rotate with the wheel. The caliper unit 105 comprises: a shaft S that is extended by a supply of compressed air to a chamber C when the brakes are operated; an operating shaft 152 that is mounted swingably on housing 151 and swings with the extension and retraction of the shaft S; a disc-shaped tappet 154 that is offset from the swing axis of this shaft 152 and receives a pressing force from contact of the operating shaft 152 with the rollers 153, 153 mounted parallel thereto; a disc-shaped sleeve 156 (also called a nut) that is supported by the housing so as to swing in the direction of the axis of the pressing operation and to rotate about this axis; a pressing screw 157 (also called a tappet) that screws onto and is supported by a screw 156*a* formed on the inner cylindrical surface of the sleeve 156 and transmits the pressing force to the pad 120; and an inner tappet 120 that is attached to the pressing screw 157 by a locking plate 158 and an outer tappet 120' that is connected to the housing 151 by a connecting member 129. The rotor 125 of the rotor unit 108 is disposed between both pads at a constant distance when the brakes are not in use.

When the brakes are operated, the shaft S that is anchored to a diaphragm mounted within the chamber elongates due to a supply of compressed air to the chamber C, presses the operating shaft 152, and is caused to swing as shown by the double dotted line in FIG. 8. At this time, because the roller 153 is mounted offset from the swinging axis of the operating shaft 152, the swinging movement of the operating shaft 152 is converted to a movement, in the direction of the axis of the pressing action of the sleeve 156, through the roller 153. With the pressing force converted in this way, the pressing screw 157 that is screwed onto the sleeve 156 presses the inner pad 120 and presses the pad 123 to the rotor 125. At this time, the housing 151 receives the reaction force and moves to the left in FIG. 8, pulling the outer pad 120' through the connecting member 129 and pressing the pad 123' to the rotor 125. Therefore, when the pressing screw 157 is pressed from one side, the rotor 125 is pressed between the inner pad 120 and the outer pad 120'; the rotor is pressed with the same pressure by both pads, resulting in friction braking of the turning rotor.

As shown in a cross sectional view in FIG. 9, the adjustment mechanism in this disc brake 5 comprises an adjustment assembly 160 that extends parallel to the axis of the swinging and turning (axis of pressing operation) of the sleeve 156. This assembly 160 comprises an adjustment wheel 163, a pin 161, a spring 164, a wrap spring 165, a drive ring 166, a multiple disc clutch 167, a wheel 168, and a gear wheel 169 centered about a bolt 162 as a central shaft supporting each member.

One end of the pin 161 is anchored to the abovementioned operating shaft 152 and converts the swinging movement of this shaft to a rotary movement of the adjustment wheel 163. The wrap spring 165 is wound around the adjustment wheel 163 and the drive ring 166. In the case of rotation in the direction in which the sleeve 156 is projected due to the operation of the brakes (in this embodiment, this is when the coil is decreasing), the wrap spring wraps around the adjustment wheel 163 and drive ring 166 and causes them to rotate together. In the case of rotation the opposite direction (when the coil is increasing), the wrap spring causes these to be engaged within the range of a weak frictional force and allows relative rotation with a rotary force in excess of the frictional force.

Figure 10:
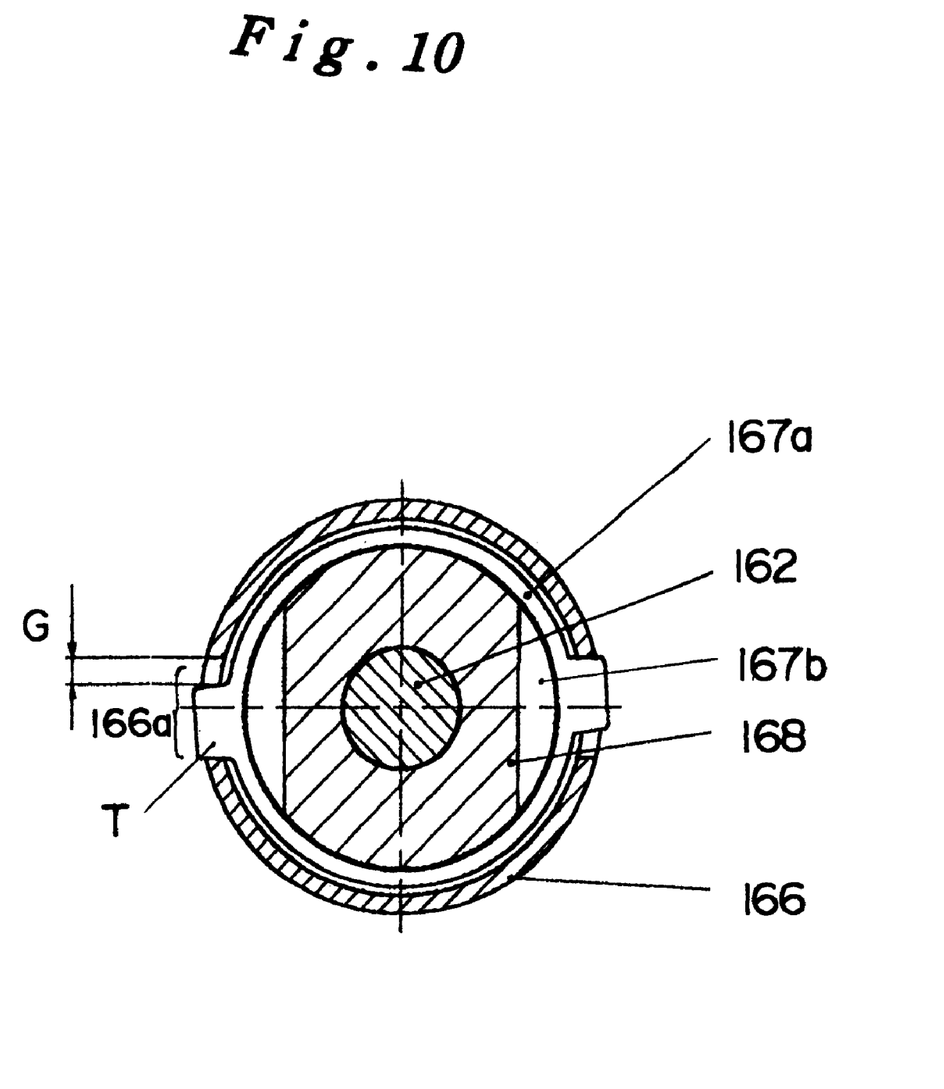
FIG. 10 is a partial cross sectional view of the adjustment mechanism portion in the abovementioned disc brake (cross section at X—X in FIG. 9)

FIG. 10 shows a cross sectional view taken at X—X in FIG. 9 of the cylindrical drive ring 166 and the multi-plate clutch 167. As shown in this figure, the drive ring 166 and the multi-plate clutch 167 are engaged with each other through the tag T of the multi-plate clutch and the gap (looseness) G in a prescribed direction of rotation at a cutout portion 166 formed in the outer portion of the drive ring 166. Rotary force is not transmitted to the multi-plate clutch 167 in the case where the angle of rotation of the drive ring 166 is within the range of the gap G. The multi-plate clutch 167 comprises a tag clutch plate 167a having a tag projecting into the cutout portion of the drive ring and engaging with the drive ring 166; and a wheel clutch plate 167b that does not have a tag and is engaged and rotates with the wheel 168. The plates in the multi-plate clutch are pressed in the direction of the shaft by the spring 164 and are engaged by friction with each other.

The wheel 168 is supported rotatably by the bolt 162 and also engages with each gear portion 156b formed on the outside of the sleeve 156 through the gear 168a that is disposed on the exterior portion of the wheel. Also, the left and right sleeves 156, 156 are connected and engaged by the gear portions 156b, 156b with a gear wheel 169 that is supported in the center thereof. The rotation of the wheel 168 is transmitted to both the left and right sleeves 156 by these gear trains.

In an adjustment mechanism with the constitution described above, the adjustment wheel 163 is rotated in accord with the angle of the swinging operation of the operating shaft 152 when the brakes are applied. The rotation of the adjustment wheel 163 is transmitted to the wrap spring 165; according to the direction of this rotation (direction of brake operation), the wrap spring 165 connects and causes the rotation of the adjustment wheel 163 and the drive ring 166, whereupon the rotation of the adjustment wheel 163 is transmitted without further processing to the drive ring 166. The rotation of the drive ring 166 is not transmitted to the multi-plate clutch 167 until the abovementioned gap G is filled up. When this gap is filled and is then rotated, that rotary force is transmitted to the wheel 168 by the multi-plate clutch 167.

Meanwhile, when the pressing screw 157 is pressed by the swinging action of the operating shaft 152 and the inner pad 120 is pressed to the rotor 125, a frictional force is developed at the screw surface between the pressing screw 157 and the sleeve 156. As a result of the development of this frictional force, the rotary force of the abovementioned wheel 168 is suppressed by the gear portion 156b of the engaged sleeve 156. For this reason, when the drive ring 166 is rotated further after the pad 123 and rotor 125 are in contact, slipping occurs between the tag clutch plate 167a and the wheel clutch plate 167b of the multi-plate clutch 167 that is anchored by friction between the drive ring 166 and the wheel 168, and the wheel 168 does not rotate.

When the brakes are released and the operating shaft 152 starts to return, the adjustment wheel 163 returns around the pin 161 in the opposite direction from when the brakes are applied. The wrap spring 165 engages the drive ring 166 and the adjustment wheel 163 by a weak frictional force opposing this rotation. The drive ring 166 is caused to rotate by an amount of the gap G between the tag T of the multi-plate clutch 167 and the cutout portion 166a of the drive ring 166. Rotation beyond that amount has no effect and does not cause rotation of the wheel 168. In other words, when the braking action is ended, the abovementioned gap G remains held with respect to the direction of rotation of the drive ring during brake operation.

Next, when the inner pad and outer pad wear away because of the braking action, the angle of the swinging operation of the operating shaft 152 until the pads contact the rotor when the brakes are operated becomes high. For this reason, in the state where the drive ring 166 rotates and the gap G is filled with the tag T of the multi-plate clutch 167, the inner pad 120 is not yet in contact with the rotor 125 and the sleeve 156 is able to rotate without receiving the weak frictional resistance from the screw surface of the pressing screw 157. Consequently, the force of rotation of the drive ring 166 is transmitted to the left and right sleeves 156, 156 through the multi-plate clutch 167, the gear 168a of the wheel 168, and the gear wheel 169, and the sleeve 156 rotates in the direction in which the engaged pressing screw 157 projects.

After that, when the inner pad 120 and rotor 125 are in contact and the frictional force acting on the engaged screw surface increases, the rotation of the sleeve 156 is suppressed. When the frictional resistance of the screw surface exceeds the frictional holding force in the multi-plate clutch, the rotation of the sleeve 156 stops and slipping occurs in the multi-plate clutch. The action when the brakes are subsequently released is the same as discussed above.

In this way, when the inner pad and outer pad become worn, the adjustment assembly 160 causes the sleeve 156 to rotate and acts so as to project the pressing screw 157. The number of rotations of the sleeve 156 is equivalent to the amount of the pressing screw 157 that is let out, meaning the amount of wear on the pads, as in the embodiment discussed above. In the present embodiment, the state of rotation of the sleeve 156 is detected by detecting the state of rotation of the wheel 168 related by a certain number of teeth to the rotation of the sleeve 156.

Figure 11:
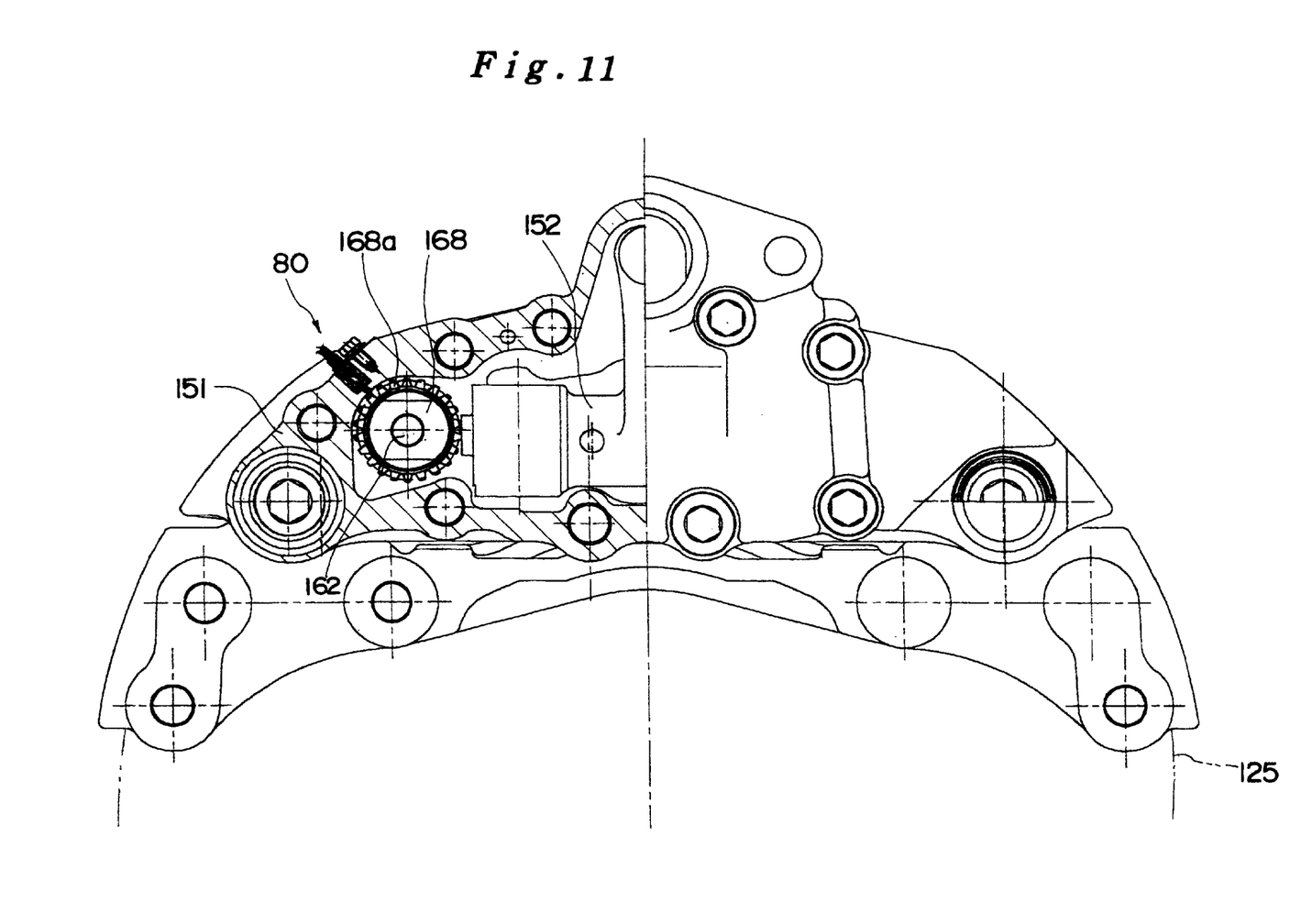
FIG. 11 is a partial cross sectional view of the abovementioned disc brake (cross section at XI—XI in FIG. 9).

When using the same type of displacement detecting device as in the embodiment discussed above in the present embodiment, the detecting head 80 is mounted so that the axis of rotation of the wheel (bolt 162) intersects with the axis of displacement of the shifting member at a position that is the exterior portion of the wheel 168 in the housing 151. FIG. 11 shows a cross sectional view at XI-XI in FIG. 9 of the relationship between the wheel 168 and the detecting head 80. The end portion 82a of the shifting member 82 touches the exterior portion of the geared outside of the wheel 168 and is disposed so as to be able to detect the passage of the gear teeth due to the rotation of the wheel 168.

The constitution of the lining wear detection apparatus 1 is the same as explained using FIG. 6. The lining wear detection apparatus comprises the displacement detection apparatus 70, controller 30, warning apparatus 90, and reset switch 35. The controller 30 monitors the state of the zero or one value (binary signal) input from the displacement detection apparatus 70 and adds one to the cumulative count value stored already in the prescribed memory of the controller when the signal value changes from 0 to 1 (or changes from 1 to 0).

The controller 30 then compares the cumulative tooth count value of the wheel 168 that is stored with the predetermined and stored count value for a wear warning (for example, when the wear limit is 10 mm as in the embodiment discussed above, this is the tooth count value corresponding to 9.5 mm for a wear warning that is found from converting the engaged screw pitch of the pressing screw 157 and sleeve 156 and the gear ratio of the sleeve 156 and wheel 168), or in other words, the tooth count value corresponding to the number of rotations of the sleeve for a wear warning. When the controller determines that the wear warning count value has not been reached, the controller continues counting without generating a warning command; when the controller determines that the wear warning count value has been reached, the controller outputs a warning command signal to the warning device 90. The warning device 90 performs a warning operation as discussed above based on the warning command signal from the controller 30.

Consequently, when the pads 123, 123' wear away and the inner pad 120 and outer pad 120' are replaced, it is necessary only to replace these pads 120, 120' and it is not necessary to replace the wear detecting jig and so forth at the same time. Consequently, it becomes possible as with the abovementioned embodiment to provide a wear detection apparatus that can reduce running costs and at the same time have no risk of wiring being cut in error when the pads are replaced. Also, because this is a constitution wherein pad wear is optically detected, it becomes possible to provide a wear detection apparatus that is highly resistant to noise such as electrical noise and it is not necessary to dispose electronics components in the vicinity of wheels which generate intense vibrations and heat while the vehicle is moving. Consequently, it is possible to provide a lining wear detection apparatus that is highly reliable and is able to withstand vibrations and its environment.

Also, the displacement detection apparatus 70 detects the state of rotation of the sleeve 156 through a shifting member 82. As a result, the reflective surface 82d (optical detecting portion) can be made small in size, and moreover it becomes possible to easily constitute an optically reflective surface which is optimal for optical detection and is unaffected by abraded dust and the lubricating oil. Consequently, it becomes possible to provide a small and low-cost lining wear detection apparatus that is highly reliable and can withstand its environment.

In the abovementioned embodiment, as means for detecting the state of rotation of the sleeve 156, a displacement detection apparatus 70 detects the state of rotation of the gear 168a formed on the wheel 168 causing rotation of the sleeve 156 at the time of the adjustment action. However, any means that detect the state of rotation of the sleeve 156 are acceptable and this constitution is not limited by the abovementioned embodiment. For example, it is possible to use and attain the same effects with the following: a constitution for directly detecting the state of rotation of the sleeve 156, or a similar constitution for detecting the state of rotation of the intermediate gear wheel 169.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2000-008529 filed on Jan. 18, 2000, which is incorporated herein by reference.

What is claimed is:

1. A brake lining wear detection apparatus for detecting wear on brake linings in a friction brake which comprises:
    a lining member on which a brake lining is provided;
    a brake member that is pressed and braked by said brake lining when the brake is activated;
    a pressing member for pressing said brake lining onto said brake member when the brake is activated;
    means for generating pressing force for causing said pressing member to exert a pressing force;
    a transmission member that screws onto said pressing member between said pressing member and said means for generating pressing force and is disposed rotatably about this screw shaft, and which transmits the pressing force generated by said means for generating pressing force to said pressing member in the direction of said screw shaft; and
    an adjustment mechanism which rotates said transmission member about a screw axis to cause the pressing member to project according to the wear on said brake lining, and which automatically adjusts the space between said brake lining and said brake member when the brake is not activated so as to become a predetermined, prescribed magnitude;
    said detection apparatus comprising:
        rotation detecting means for detecting the state of rotation of said transmission member or of a rotating member which rotates said transmission member;
        means for storing a number of rotations that counts and stores the number of rotations of said transmission member or said rotating member from said state of rotation detected by said rotation detecting means; and
        warning means for performing a warning operation when it is determined that the number of rotations stored in said means for storing a number of rotations has exceeded a predetermined and stored limit number of rotations.

2. The brake lining wear detection apparatus, according to claim 1, wherein said friction brake is constituted of a drum brake comprising:
    a brake shoes on which the brake lining is provided;
    a brake drum that is braked by the brake lining being pressed thereon when the brake is activated;
    a pressing screw for pressing the brake lining against said brake drum when the brake is activated;
    a pressing force generating mechanism for applying pressing force to said pressing screw;
    a sleeve that screws onto said pressing screw and is disposed rotatably about the screw shaft for transmitting the pressing force in the direction of the screw shaft to said pressing screw; and an adjustment mechanism which rotates said transmission member about said screw axis to cause the pressing member to project according to the wear on said brake lining, and which automatically adjusts the space between said brake lining and said brake member when the brake is not activated.

3. The brake lining wear detection apparatus, according to claim 1, wherein said friction brake is constituted of a disc brake comprising:

inner pads and outer pads on which the brake lining is provided;

a rotor that is braked by the brake lining being pressed thereon when the brake is activated;

a pressing screw for pressing the brake lining against the rotor when the brake is activated;

a pressing force generating mechanism for applying pressing force to said pressing screw;

a sleeve that screws onto said pressing screw and is disposed rotatably about the screw shaft for transmitting the pressing force in the direction of the screw shaft to said pressing screw; and an adjustment mechanism which rotates said transmission member about said screw axis to cause the pressing member to project according to the wear on said brake lining, and which automatically adjusts the space between said brake lining and said brake member when the brake is not activated.

4. The brake lining wear detection apparatus, according to claim 1, in which the outer surface of said transmission member or said rotating member includes a depression or projection that is displaced when said transmission member or said rotating member is caused to rotate; and said rotation detecting means comprises:

a shifting member that is in contact with said outer surface and is displaced along with said depression or projection; and optical detection means for optically detecting the displacement of said shifting member;

wherein the state of rotation of said transmission member or said rotating member is detected by counting the number of passes of said depression or projection by means of said optical detecting means.

5. The brake lining wear detection apparatus, according to claim 4, wherein an optically reflective surface is formed on the back end face of said shifting member; and said optical detection means comprises a light radiating device for radiating detection light onto said optically reflective surface; and a light detector for detecting said detection light reflected from said optically; and wherein the state of rotation of said transmission member or said rotating member is detected by detecting change of said detection light that is detected by said light detector according to the displacement of said shifting member.

6. The brake lining wear detection apparatus, according to claim 1, wherein, when it is determined that the number of rotations calculated and stored by said means for storing a number of rotations has exceeded a predetermined and stored limit number of rotations, said warning means activates a warning operation to warn the driver that said brake lining is approaching the wear limit, by lighting a brake lining wear warning lamp that is disposed at the vehicle driver's seat, or by means of a voice alarm.

7. The brake lining wear detection apparatus, according to claim 1, wherein said warning means displays a wear notice when the number of rotations calculated and stored by said means for storing a number of rotations has exceeded a first stage limit number; displays a wear warning when has exceeded a second stage limit number that is greater than the first one; and activates a warning operation when has exceeded a third stage limit number of rotations that is still greater than the second one.

8. The brake lining wear detection apparatus, according to claim 7, wherein said warning operation comprises sounding a warning buzzer or cutting fuel so that the vehicle speed does not exceed a certain speed.

9. The brake lining wear detection apparatus, according to claim 1, wherein the number of rotations stored in the means for storing a number of rotations is reset to an initial value when said brake lining member is replaced.

* * * * *